(12) United States Patent
Trentini

(10) Patent No.: US 10,919,703 B2
(45) Date of Patent: Feb. 16, 2021

(54) BELT CONVEYOR AND MODULAR CONVEYOR BELT FOR INCLINES

(71) Applicant: Laitram, L.L.C., Harahan, LA (US)

(72) Inventor: Nathan L. Trentini, Frederick, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/625,087

(22) PCT Filed: Jun. 21, 2018

(86) PCT No.: PCT/US2018/038789
§ 371 (c)(1),
(2) Date: Dec. 20, 2019

(87) PCT Pub. No.: WO2019/013946
PCT Pub. Date: Jan. 17, 2019

(65) Prior Publication Data
US 2020/0165067 A1    May 28, 2020

Related U.S. Application Data

(60) Provisional application No. 62/530,465, filed on Jul. 10, 2017.

(51) Int. Cl.
*B65G 15/42*    (2006.01)
*B65G 15/58*    (2006.01)
(Continued)

(52) U.S. Cl.
CPC ............ *B65G 15/58* (2013.01); *B65G 17/08* (2013.01); *B65G 17/38* (2013.01); *B65G 2207/30* (2013.01); *B65G 2207/40* (2013.01)

(58) Field of Classification Search
CPC ........ B65G 15/42; B65G 15/58; B65G 17/08; B65G 17/083; B65G 2812/02217
(Continued)

(56) References Cited

U.S. PATENT DOCUMENTS 2,675,906 A * 4/1954 Wagner ................ B65G 15/32
198/699.1
2,732,867 A * 1/1956 Doe ...................... B27B 25/04
144/128
(Continued)

FOREIGN PATENT DOCUMENTS

JP    2007-031022 A    2/2007
KR    20-0431709 Y1    11/2006

OTHER PUBLICATIONS

INTRALOX Engineering Manual Modular Plastic Conveyor Belts, pp. 191, 197, 201, Intralox, L.L.C., Harahan, Louisiana, U.S.A. 2016.

*Primary Examiner* — Joseph A Dillon, Jr.
(74) *Attorney, Agent, or Firm* — James T. Cronvich

(57) ABSTRACT

An incline conveyor using a modular conveyor belt with a repeating pattern of belt sections. Each belt section includes a first region with a high-friction flat top surface, a second region with a high-friction textured top surface, a third region between the first and second regions with a recessed low-friction top surface, and a fourth region between consecutive belt sections with a top surface like that of the third region. The textured top surface, which may be formed by a plurality of nodules, provides multiple high-friction catch points to stop polybags from sliding down the inclined conveyor.

24 Claims, 3 Drawing Sheets

(51) Int. Cl.
*B65G 17/08* (2006.01)
*B65G 17/38* (2006.01)

(58) Field of Classification Search
USPC .......... 198/688.1, 699.1, 850, 851, 852, 853
See application file for complete search history.

(56) References Cited

U.S. PATENT DOCUMENTS

| | | | |
|---|---|---|---|
| 2,977,266 A * | 3/1961 | Sedgley | B65G 15/42 198/692 |
| 3,291,288 A * | 12/1966 | Haustovich | B65G 15/08 198/699.1 |
| 3,306,218 A * | 2/1967 | Reeves | E04G 21/0409 198/547 |
| 3,661,245 A * | 5/1972 | Mol | B65G 15/34 198/688.1 |
| 4,185,447 A * | 1/1980 | Howerton | A01D 78/06 198/515 |
| 4,747,747 A * | 5/1988 | Fusco | B60P 1/365 198/834 |
| 4,832,183 A | 5/1989 | Lapeyre | |
| 5,323,893 A * | 6/1994 | Garbagnati | B65G 17/08 198/690.2 |
| 5,377,819 A | 1/1995 | Horton et al. | |
| 5,497,874 A * | 3/1996 | Layne | B65G 17/08 198/377.01 |
| 5,628,393 A | 5/1997 | Steeber et al. | |
| 5,735,388 A * | 4/1998 | Brouwer | B65G 13/10 198/699.1 |
| 6,371,280 B1 * | 4/2002 | Lindner | A01F 15/18 198/690.2 |
| 7,559,422 B2 * | 7/2009 | Layne | B65G 17/08 198/850 |
| 7,802,676 B2 * | 9/2010 | Guldenfels | B65G 17/08 198/853 |
| 8,528,742 B2 | 9/2013 | Wargo et al. | |
| 9,527,671 B2 * | 12/2016 | Marshall | B65G 17/06 |
| 2012/0061209 A1 * | 3/2012 | Memoli | B65G 17/40 198/699.1 |
| 2014/0166443 A1 | 6/2014 | Shinobu | |
| 2017/0327316 A1 * | 11/2017 | Minkin | B65G 15/42 |
| 2018/0027733 A1 * | 2/2018 | Ravaglia | B65G 15/42 |
| 2020/0196529 A1 * | 6/2020 | Schwefe | B65G 15/36 |

\* cited by examiner

BELT CONVEYOR AND MODULAR CONVEYOR BELT FOR INCLINES

BACKGROUND

The invention relates generally to power-driven conveyors and in particular to belt conveyors using modular conveyor belts with differing conveying surfaces along their lengths.

In many parcel- and mail-handling facilities, bulks of parcels and letters are conveyed up an incline. Modular plastic conveyor belts are often used in incline conveyors to elevate a mass of parcels and mail to a higher level for further processing. The belts typically are constructed of a few rows of belt modules having high-friction flat upper surfaces alternating with rows of belt modules having low-friction flat top surfaces. Those belts work well with boxes and most packages. But polybags, which are made of thin, flexible plastic films or fabrics, tend to slide down the flat high-friction top surface, which limits the steepness of the incline and increases the footprint of the conveyor.

SUMMARY

One version of a modular conveyor belt embodying features of the invention comprises a series of rows of one or more belt modules hingedly linked together at hinge joints between consecutive rows. The rows are arranged in a repeating pattern of belt sections along a belt travel direction. Each belt section includes first, second, third, and fourth region. The first region is formed by one or more first rows of first belt modules having a flat top surface made of a first high-friction material having a first hardness durometer. The second region is formed by one or more second rows of second belt modules having a textured top surface made of a second high-friction material having a second hardness durometer. The third region is formed by one or more third rows of third belt modules disposed between the first and second regions and having a low-friction flat top surface recessed below the levels of the flat top surface of the first region and the textured top surface of the of the second region. The fourth region is formed by consecutive fourth rows of the third belt modules disposed between the second region and the first region of a consecutive belt section.

Another version of a modular conveyor belt embodying features of the invention comprises a series of rows of one or more belt modules hingedly linked together at hinge joints between consecutive rows. The rows are arranged in a repeating pattern of belt sections along a belt travel direction. Each belt section includes: (a) a first region formed by one or more first rows of first belt modules having a top surface made of a first high-friction material having a first hardness durometer; (b) a second region formed by one or more second rows of second belt modules having a top surface made of a second high-friction material having a second hardness durometer less than the first hardness durometer; (c) a third region formed by one or more third rows of third belt modules disposed between the first and second regions and having a low-friction flat top surface recessed below the levels of the flat top surface of the first region and the textured top surface of the of the second region; and (d) a fourth region formed by consecutive fourth rows of the third belt modules disposed between the second region and the first region of a consecutive belt section.

In another aspect a conveyor embodying features of the invention comprises a conveyor frame extending from a lower end to an upper end and defining an inclined carryway path, lower reversing elements supported in the conveyor frame at the lower end and upper reversing elements supported in the conveyor frame at the upper end, and a modular conveyor belt supported in the conveyor frame and trained around the upper and lower reversing elements. A top run on the carryway path extends from the lower reversing element to the upper reversing element, and a lower return run extends from the upper reversing element to the lower reversing element. A drive motor coupled to the upper reversing element drives the modular conveyor belt up the inclined carryway path. The modular conveyor belt includes a series of rows of one or more belt modules hingedly linked together at hinge joints between consecutive rows. The rows are arranged in a repeating pattern of belt sections. Each belt section includes: (a) a first region formed by one or more first rows of first belt modules having a flat top surface made of a first high-friction material having a first hardness durometer;
(b) a second region formed by one or more second rows of second belt modules having a textured top surface made of a second high-friction material having a second hardness durometer; (c) a third region formed by one or more third rows of third belt modules disposed between the first and second regions and having a low-friction flat top surface recessed below the levels of the flat top surface of the first region and the textured top surface of the of the second region; and (d) a fourth region formed by consecutive fourth rows of the third belt modules disposed between the second region and the first region of a consecutive belt section.

DETAILED DESCRIPTION

Figure 1:
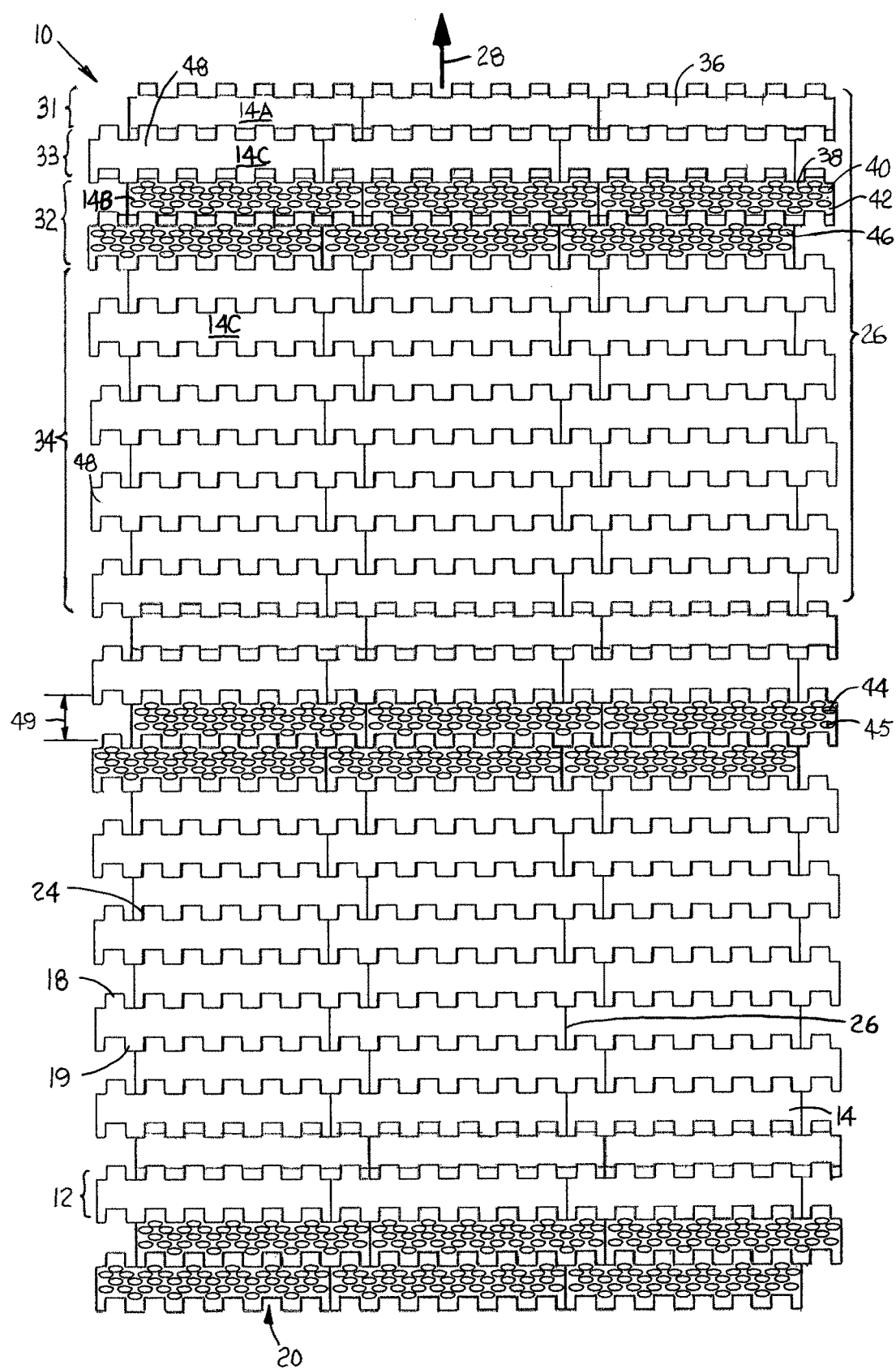
FIG. 1 is a top plan view of an interior portion of a modular conveyor belt embodying features of the invention.
Figure 2:
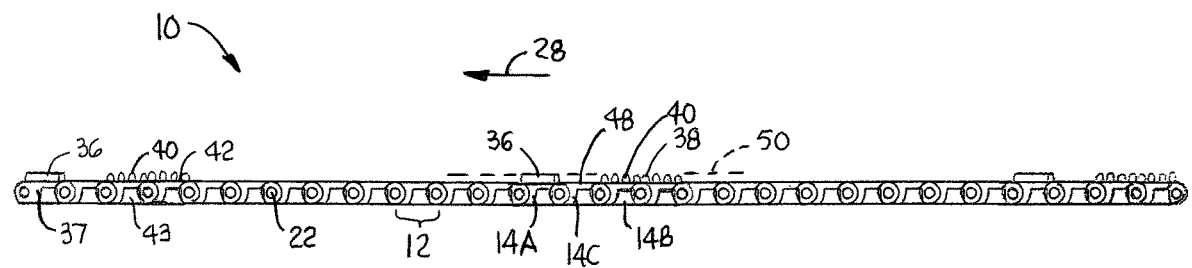
FIG. 2 is a side elevation view of a length of a modular conveyor belt as in FIG. 1.

FIGS. 1 and 2 show portions of a modular conveyor belt embodying features of the invention. In particular FIG. 1 shows the interior portion of a modular plastic conveyor belt 10. The belt 10 is constructed of a series of rows 12 of belt modules 14. In this example each row 12 includes more than one belt module 14. But each row could be constructed of a single wide belt module. In FIG. 1 the belt modules 14 are arranged in a bricklay pattern. Side-by-side modules in each row 12 are separated by a seam 16. The belt extends in width beyond the interior modules shown in FIG. 1 to opposite left and right side edges formed by edge modules (not shown). Each row 12 has leading and trailing hinge elements 18, 19 laterally spaced across intervening gaps 20. The leading hinge elements of a trailing row are interleaved with the trailing hinge elements of a leading row. The hinge elements 18, 19 have lateral openings that are aligned when the hinge elements are interleaved. The aligned openings form a lateral passageway for a hinge rod 22 (FIG. 2) that joins the adjacent rows 12 together at a hinge joint 24 at which the belt can articulate.

The conveyor belt 10 is constructed with the rows 12 arranged in a repeating pattern of belt sections 26 along the length of the belt in a belt travel direction 28. Each belt section 26 consists of four regions: (a) a first region 31 formed by one or more first rows of first belt modules 14A; (b) a second region 32 formed by one or more second rows of belt modules 14B; (c) a third region 33 formed by one or more third belt module 14C disposed between the first and second regions; and (d) a fourth region 34 formed by consecutive fourth rows of the third belt modules 14C disposed between the second region and the first region of a trailing adjacent belt section.

In the example of FIG. 1, the first region 31 and the third region 33 are shown with only a single row 14A, 14C, and the second region 32 is shown with two rows 14B. The length of the fourth region 34 in the belt travel direction 28 is greater than the combined length of the first, second, and third regions 31, 32, 33. As another example, the second region could be made with only a single row 14B.

The first belt modules 14A in this example have a flat top surface 36 made of a durable high-friction rubber or elastomeric material having a hardness durometer of at least 55 Shore A, for example, around 64 Shore A. The durable high-friction material covers the majority of the module 14A, but does not extend onto the hinge joint 24. The top surface 36 is a rubber or elastomeric layer attached to a rigid module body 37 made of a thermoplastic polymer, such as polypropylene or polyethylene. The thickness (height) of the top surface 36 above the module body 37 is less than the layer's length and width. One example of such a belt module is the Series 1400 INTRALOX® Flat Friction Top module manufactured and sold by Intralox, L.L.C., of Harahan, La., U.S.A.

The second belt modules 14B in this example have a textured top surface 38 made of a high-friction rubber or elastomeric material having a hardness durometer of no more than 55 Shore A. The durometer of the top-surface material of the second belt modules 14B is less than or equal to the durometer of the top-surface material of the first belt modules 14A. The textured top surface 38 of the second belt modules 14B is a rubber or elastomeric layer formed by raised nodules 40 that extend upward from a top base 42 of the top surface. The top base 42 with the nodules 40 is attached to a rigid module body 43 like the module body 37 of the first belt modules 14A. The distance from the tops 46 of the nodules 40 to the rigid module body 43, i.e., the height of the nodules, is less than the length and the width of their top base 42. The nodules 40 are shown as elliptical or oval in shape with major axes 44 perpendicular to the belt travel direction 28. One example of such a belt module is the INTRALOX® Series 1400 Oval Friction Top module. Other textured top surfaces 38 include diamond-, cone-, and dome-shaped nodules. The oval nodules 40 shown in FIG. 1 are separated from neighboring nodules by an interspace distance roughly equal to the lengths of their minor axes 45. The nodule structure of the textured top surface 38 with the spaced oval nodules 40 gives the nodules room to resiliently deform and provide even more friction than is provided by the lower Shore A durometer alone. The oval nodules 40 occupy about 60% of the area of the base 42. Other nodule shapes with smaller interspaces could occupy up to about 80% of the base area. The tops 46 of the nodules 40 are shown as flat, but they could be rounded.

The third belt modules 14C do not have a high-friction top surface. Rather the top surface 48 of each third belt module 14C is a rigid, low-friction surface, such as acetal, polypropylene, or nylon. One example of such a belt module is the INTRALOX® Series 1400 Flat Top module. The top surfaces 48 of the third belt modules 14C are recessed below the level 50 of the top surfaces 36, 38 of the first and second belt modules 14A, 14B, as better shown in FIG. 2. The top surfaces 36, 38 of the first and second belt modules 14A, 14B are shown at the same level, but they could be at different levels. For example, the top surface 36 of the first belt modules could lie in a plane above the plane defined by the tops of the nodules 40 of the second belt modules 14B. The first and second belt modules 14A, 14B could be made by molding or otherwise adhering a high-friction top surface 36, 38 to the top surface 48 of a third belt module 14C.

The INTRALOX® Series 1400 belts have a pitch 49, i.e., the distance between consecutive hinge joints 24, of one inch. The number of rows in each region may be different in belts having shorter or longer pitches.

Figure 3:
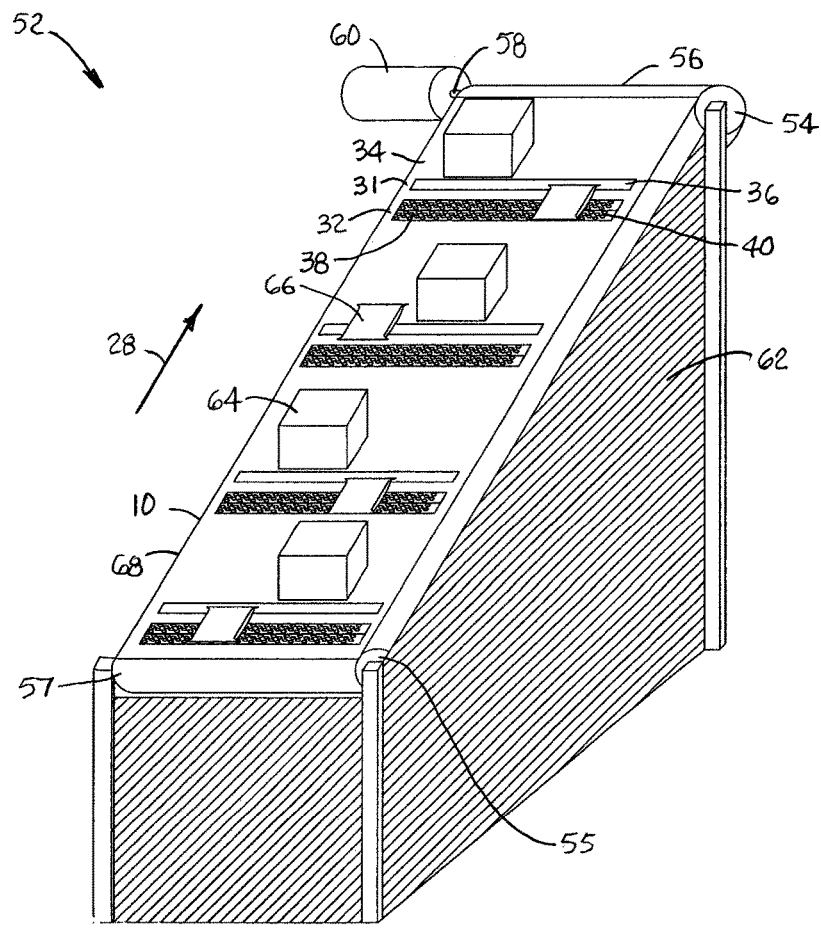
FIG. 3 is a perspective view of an incline conveyor using a modular conveyor belt as in FIG. 1.

An inclined conveyor 52, or elevator, using a conveyor belt 10 as in FIG. 1 is shown in FIG. 3. The belt 10 is trained around upper and lower reversing elements 54, 55 at upper and lower ends 56, 57 of the inclined conveyor 52. The upper reversing element 54 can be a set of drive sprockets mounted on a drive shaft 58 coupled via a gearbox to a drive motor 60 that drives the belt 10 up the incline in the belt travel direction 28. The lower reversing element 55 can be a set of idle sprockets on a shaft (not shown). As another example, the upper reversing element can be a motorized drum drive. The reversing elements 54, 55, the motor 60, the shafts 58, and the conveyor belt 10 are supported in a conveyor frame 62.

The elevator 52 conveys boxes 64, polybags 66, and other items up the inclined path along an upper carryway run 68 from the lower end 57 to the upper end 56. Besides driving the belt 10, the upper reversing element 54 transitions the belt from the carryway run 68 to a lower returnway run (not shown) below and parallel to the upper carryway. Filled boxes 64, which are generally heavier than polybags and made of a higher-friction material, are less likely to slide down the incline conveyor 52 under the influence of gravity. If the boxes 64 do happen to slide down the low-friction top surface in the fourth region 34, they then encounter the high-friction top surface 36 of the first region 31, which inhibits further sliding. Because polybags 66 usually have lighter-weight contents, are made of a low-friction plastic material, and have soft, rounded edges and not the stiff corners of boxes, they are more likely to slide down the incline in the fourth region 34 and climb over the front edge of the flat high-friction top surface 36 in the first region 31. But they are inhibited from sliding further by contact with the upper edge of the textured top surface 38 of the second region 32. The nodules 40 provide multiple catch points to the polybags 66. In that way the polybags 66 are stopped from sliding and are conveyed up the inclined conveyor 52.

Figure 4:
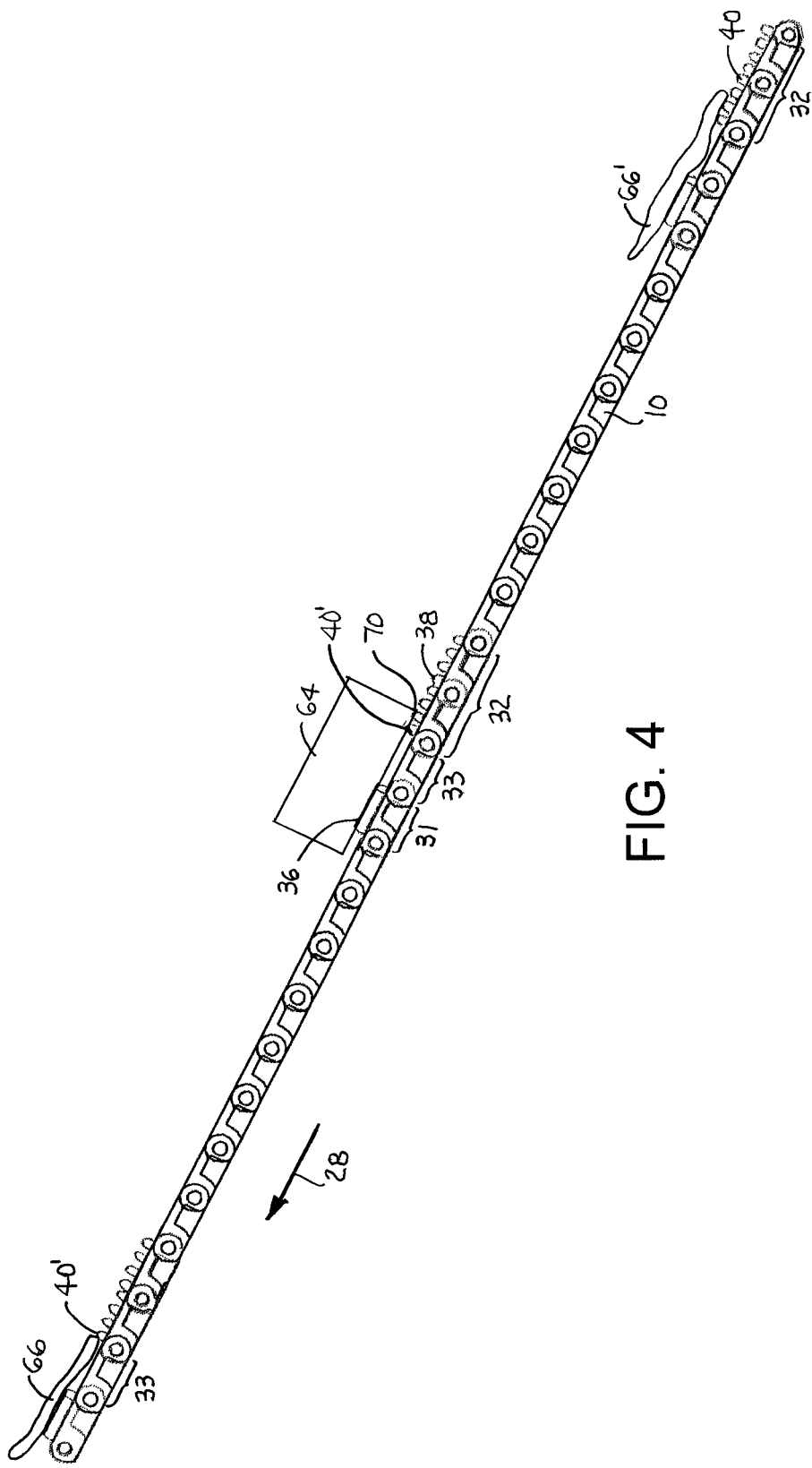
FIG. 4 is an enlarged side view of a conveyor belt as in FIG. 2 on an elevator carryway illustrating its performance with boxes and polybags.

The effect of the surface pattern in each belt section 26 on boxes 64 and polybags 66 is shown in FIG. 4. The box 64 is shown supported atop the flat high-friction top surface 36 of the leading first region 31 and the leading few rows of nodules 40 of the textured top surface 38 of the trailing second region 32. The flat top surface 36 tends to prevent the trailing edge 70 from dipping into the recessed third region 33 and ramming into and wearing down the leading row 40' of nodules in the second region 32. The recessed third region 33 is short enough that the raised first region 31 can prevent the relatively stiff bottom of the box 64 from drooping into the recess.

The polybag 66 at the upper end of the figure is shown stopped from sliding by initial contact with the leading row 40' of nodules. The polybag 66 sags into the recessed third region 33 and catches on the leading nodules 40'. The polybag 66' at the lower end of the figure is shown stopped from sliding by contact with the tops of the nodules 40 in the second region 32. The nodule 40 provide multiple catch points to the flexible outer surface of the polybag 66 and prevent it from sliding down the belt on the incline.

What is claimed is:

1. A modular conveyor belt comprising:
    a series of rows of one or more belt modules hingedly linked together at hinge joints between consecutive rows, wherein the rows are arranged in a repeating pattern of belt sections along a belt travel direction, each belt section including:
    a first region formed by one or more first rows of first belt modules having a flat top surface made of a first high-friction material having a first hardness durometer;
    a second region formed by one or more second rows of second belt modules having a textured top surface made of a second high-friction material having a second hardness durometer;
    a third region formed by one or more third rows of third belt modules disposed between the first and second regions and having a low-friction flat top surface recessed below the levels of the flat top surface of the first region and the textured top surface of the of the second region;
    a fourth region formed by consecutive fourth rows of the third belt modules disposed between the second region and the first region of a consecutive belt section.

2. A modular conveyor belt as in claim 1 wherein the first region consists of one first row, the second region consists of two second rows, the third region consists of one third row, and the fourth region consists of more than two third rows.

3. A modular conveyor belt as in claim 2 wherein the fourth region is formed of more belt rows than the first, second, and third regions combined.

4. A modular conveyor belt as in claim 1 wherein the first hardness durometer is greater than the second hardness durometer.

5. A modular conveyor belt as in claim 1 wherein the first hardness durometer is greater than or equal to 55 Shore A and the second hardness durometer is less than or equal to 55 Shore A.

6. A modular conveyor belt as in claim 1 wherein the textured top surface is formed by a plurality of raised nodules extending upward from a recessed top base.

7. A modular conveyor belt as in claim 6 wherein the height of the nodules is less than the length and width of the textured top surface of the second belt modules.

8. A modular conveyor belt as in claim 6 wherein the nodules have flat tops.

9. A modular conveyor belt as in claim 6 wherein the nodules are elliptical or oval-shaped with major axes perpendicular to the belt travel direction.

10. A modular conveyor belt as in claim 6 wherein the nodules occupy about 60% of the recessed top base.

11. A conveyor comprising:
    a conveyor frame extending from a lower end to an upper end and defining an inclined carryway path;
    lower reversing elements supported in the conveyor frame at the lower end and upper reversing elements supported in the conveyor frame at the upper end;
    a modular conveyor belt supported in the conveyor frame and trained around the upper and lower reversing elements with a top run on the carryway path extending from the lower reversing element to the upper reversing element and a lower return run extending from the upper reversing element to the lower reversing element;
    a drive motor coupled to the upper reversing element to drive the modular conveyor belt up the inclined carryway path;
    wherein the modular conveyor belt includes:
    a series of rows of one or more belt modules hingedly linked together at hinge joints between consecutive rows, wherein the rows are arranged in a repeating pattern of belt sections, each belt section including:
    a first region formed by one or more first rows of first belt modules having a flat top surface made of a first high-friction material having a first hardness durometer;
    a second region formed by one or more second rows of second belt modules having a textured top surface made of a second high-friction material having a second hardness durometer;
    a third region formed by one or more third rows of third belt modules disposed between the first and second regions and having a low-friction flat top surface recessed below the levels of the flat top surface of the first region and the textured top surface of the of the second region;
    a fourth region formed by consecutive fourth rows of the third belt modules disposed between the second region and the first region of a consecutive belt section.

12. A conveyor as in claim 11 wherein the first region of each belt section leads the second and third region up the inclined carryway path.

13. A conveyor as in claim 11 wherein the first region consists of one first row, the second region consists of two second rows, the third region consists of one third row, and the fourth region consists of more than two third rows.

14. A conveyor as in claim 13 wherein the fourth region is formed of more belt rows than the first, second, and third regions combined.

15. A conveyor as in claim 13 wherein the first hardness durometer is greater than the second hardness durometer.

16. A conveyor as in claim 13 wherein the first hardness durometer is greater than or equal to 55 Shore A and the second hardness durometer is less than or equal to 55 Shore A.

17. A conveyor as in claim 13 wherein the textured top surface is formed by a plurality of raised nodules that are elliptical or oval-shaped with major axes perpendicular to the belt travel direction.

18. A conveyor as in claim 11 wherein the height of the nodules is less than the length and width of the textured top surface of the second belt modules.

19. A modular conveyor belt comprising:
    a series of rows of one or more belt modules hingedly linked together at hinge joints between consecutive rows, wherein the rows are arranged in a repeating pattern of belt sections along a belt travel direction, each belt section including:
    a first region formed by one or more first rows of first belt modules having a top surface made of a first high-friction material having a first hardness durometer;
    a second region formed by one or more second rows of second belt modules having a top surface made of a second high-friction material having a second hardness durometer less than the first hardness durometer;

a third region formed by one or more third rows of third belt modules disposed between the first and second regions and having a low-friction flat top surface recessed below the levels of the flat top surface of the first region and the textured top surface of the of the second region;

a fourth region formed by consecutive fourth rows of the third belt modules disposed between the second region and the first region of a consecutive belt section.

20. A modular conveyor belt as in claim 19 wherein the first region consists of one first row, the second region consists of two second rows, the third region consists of one third row, and the fourth region consists of more than two third rows.

21. A modular conveyor belt as in claim 19 wherein the first hardness durometer is greater than or equal to 55 Shore A and the second hardness durometer is less than or equal to 55 Shore A.

22. A modular conveyor belt as in claim 19 wherein the top surface of the rows of second belt modules is formed by a plurality of raised nodules extending upward from a recessed top base.

23. A modular conveyor belt as in claim 22 wherein the nodules are elliptical or oval-shaped with major axes perpendicular to the belt travel direction.

24. A modular conveyor belt as in claim 22 wherein the height of nodules is less than its length and width of the top surface of the second belt modules.

\* \* \* \* \*